United States Patent
Cho et al.

(10) Patent No.: US 7,629,083 B2
(45) Date of Patent: Dec. 8, 2009

(54) METHOD OF PREPARING A LITHIUM METAL ANODE

(75) Inventors: Chung-Kun Cho, Suwon-si (KR);
Duck-Chul Hwang, Cheonan-si (KR);
Sang-Mock Lee, Yongin-si (KR);
Seung-Sik Hwang, Seongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 843 days.

(21) Appl. No.: 10/920,196

(22) Filed: Aug. 18, 2004

(65) Prior Publication Data
US 2005/0079420 A1    Apr. 14, 2005

(30) Foreign Application Priority Data
Aug. 19, 2003    (KR)    ............ 10-2003-0057282

(51) Int. Cl.
*H01M 4/58*    (2006.01)
(52) U.S. Cl. ............ 429/231.95; 429/245; 429/126; 429/142; 429/144; 429/233; 427/123
(58) Field of Classification Search ............ 429/231.95, 429/126, 142, 144, 245, 233; 427/123
See application file for complete search history.

(56) References Cited

U.S. PATENT DOCUMENTS

| | | | |
|---|---|---|---|
| 6,214,061 B1 | 4/2001 | Visco et al. | ............ 29/623.5 |
| 6,991,662 B2 * | 1/2006 | Visco et al. | ............ 429/231.95 |
| 7,066,971 B1 * | 6/2006 | Carlson | ............ 429/231.9 |

FOREIGN PATENT DOCUMENTS

| | | |
|---|---|---|
| CN | 1415124 | 4/2003 |
| JP | 2003-282142 | 10/2003 |
| JP | 2004-311073 | 11/2004 |

* cited by examiner

*Primary Examiner*—Laura S Weiner
(74) *Attorney, Agent, or Firm*—H.C. Park & Associates, PLC

(57) ABSTRACT

Provided is a method of preparing a lithium metal anode including forming a current collector on a substrate that includes a release component; depositing a lithium metal on the current collector; and releasing the current collector with the deposited lithium metal from the substrate. The method may produce a lithium metal anode with a clean lithium surface and a current collector with a small thickness. The lithium metal anode may be used to increase the energy density of a battery.

19 Claims, 2 Drawing Sheets

METHOD OF PREPARING A LITHIUM METAL ANODE

This application claims the benefit of Korean Patent Application No. 2003-57282, filed on Aug. 19, 2003, which is hereby incorporated by reference for all purposes as if fully set forth herein.

BACKGROUND OF THE INVENTION

1. Field of the Invention

The present invention relates to a method of preparing a lithium metal anode, and more specifically, to a method of preparing a lithium metal anode with high energy density.

2. Discussion of the Related Art

With the increasing need for smaller portable electronic devices, such as camcorders, communication devices, and computers, the need for more compact, lighter, thinner and capable batteries to drive such devices has also increased. Conventional lithium ion secondary batteries may utilize a transition metal oxide (such as $LiCoO_2$) as a cathode active material and carbon as an anode active material. Carbon has a theoretical capacity of 372 mA/g, resulting in a battery with low energy density.

However, when using lithium metal as an anode instead of carbon, a battery has higher energy density and lower weight since lithium has the highest potential difference ($-3.045$ V vs a standard hydrogen electrode (SHE)) among metals and a low density ($0.53$ g/cm$^2$), to go along with its high theoretical capacity of 3860 mAh/g. But due to its high reactivity, lithium metal tends to react with oxygen, nitrogen, and carbon dioxide when exposed to air, even at room temperature, thereby forming $Li_2CO_3$, $Li_2O$, LiOH and other like substances on its surface. Thus, it is very difficult to obtain lithium metal with a clean surface. Additionally, lithium metal tends to react with an electrolytic solution to form a passivity layer, which is not chemically or physically uniform, thereby causing a localized current density on an electrode surface. This facilitates localized dendrite growth, resulting in a short circuit in the battery. Moreover, the formation of dead lithium on the anode reduces its capacity. Accordingly, an organic, inorganic or organic/inorganic hybrid thin film may be formed on the lithium metal surface to inhibit a reaction between the lithium metal and the electrolytic solution. However, if the lithium metal surface to be coated is not initially clean, the thin film does not function well as a protective layer.

To overcome these problems, a method has been developed in which a lithium metal is vacuum deposited on a substrate to form a lithium layer with a clean surface, and an organic, inorganic or organic/inorganic thin film is formed thereon before exposing the product to air. In this method, the substrate may be composed of a metal, including copper, aluminium or nickel, or a film of polymer, including polyester, polyethylene, polypropylene or polyimide. However, depositing the lithium metal generates a lot of heat, which will likely deform a thin substrate. Thus, it is necessary to use a substrate that is at least about 15 μm thick. However, a 15 μm thick substrate may result in a battery with low energy density.

U.S. Pat. No. 6,214,061 discloses a method of preparing an electrode in which a 50 Å copper film is formed as a release layer on a substrate composed of polymer. An inorganic film, a lithium film and a current collector are sequentially formed on the release layer, and the polymer substrate is then released. However, a release component of copper film has poor release properties, and after the substrate is released, copper may remain on the protective inorganic layer, thus inhibiting lithium ion movement and deteriorating the battery's performance.

SUMMARY OF THE INVENTION

The present invention provides a method of preparing a lithium metal anode with high energy density per volume.

The present invention also provides a lithium metal anode with high energy density per volume.

Additional features of the invention will be set forth in the description which follows, and in part will be apparent from the description, or may be learned by practice of the invention.

The present invention discloses a method of preparing a lithium metal anodeincluding forming a current collector on a substrate that includes a release component, depositing a lithium metal on the current collector, and releasing the current collector with the deposited lithium metal from the substrate.

The present invention also discloses a lithium metal anode comprised of a current collector layer and a lithium metal layer formed on the current collector layer. The current collector layer and the lithium metal layer were released from a substrate that included a release layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
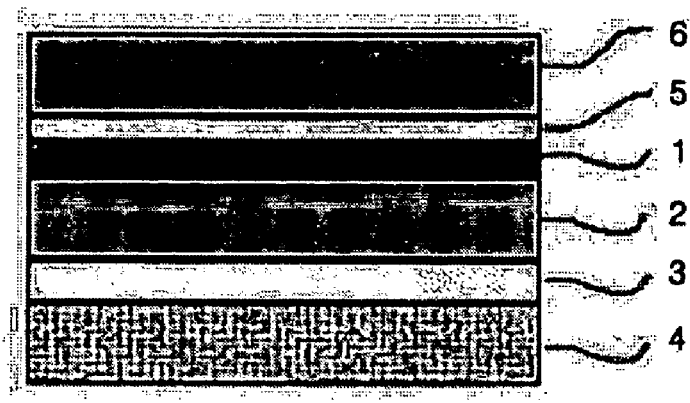
FIG. 1 is a cross-sectional view of a lithium metal anode after a separator is attached and before being released from a substrate.

Hereinafter, exemplary embodiments of the present invention will be described in detail.

In a method of preparing a lithium metal anode according to an exemplary embodiment of the present invention, a current collector is formed on a substrate that includes a release component. Thus, the thickness of the substrate on which the lithium metal is deposited may be increased to prevent heat deformation of the substrate when depositing the lithium metal. Additionally, after the lithium metal is deposited, the substrate is released from the current collector, resulting in a thin lithium metal anode. Accordingly, the energy density of the battery may be increased.

In the method of preparing a lithium metal anode according to another exemplary embodiment of the present invention, a current collector is formed on a substrate that includes a release component, a lithium metal is deposited on the current collector, and the current collector with the deposited lithium metal is released from the substrate. After depositing the lithium metal on the current collector, the lithium metal may be pretreated or a protective layer may be deposited on it. Pretreating is performed with oxygen plasma, nitrogen plasma, carbon dioxide plasma, by a simple exposure to gas, by depositing an inorganic material having an ionic conductivity, by depositing a copper metal film or by depositing a nickel metal film. If a solution of polymeric electrolytes is directly coated on un-treated lithium metal, the lithium metal may react with a solvent of the solution, which may damage the lithium metal surface. Pretreatment reduces the lithium metal's reactivity and prevents surface damage. For example, pretreatment by nitrogen plasma may form a lithium nitrides layer on the lithium metal surface. Further, with pretreatment by deposition of a copper film, copper diffuses toward lithium when the battery is operated, and thus there is no problem in the movement of lithium ions.

Alternatively, to inhibit the formation of lithium dendrites as described above, a protective layer may be formed on the lithium metal surface. The protective layer may be a metal layer, an organic material layer, an inorganic material layer, an organic material/inorganic material layer, an inorganic material/organic material layer, an inorganic material/organic material/inorganic material layer, or an organic material/inorganic material/organic material layer. The organic material may be a PEO-based polymer, a siloxane-based polymer, a phosphazine-based polymer or a mixture thereof.

The inorganic material used for pretreating the lithium metal or included in the protective layer may be a lithium nitride, a lithium carbonate, a lithium silicate, a lithium borate, a lithium aluminate, a lithium phosphate, a lithium phosphorous oxynitride, a lithium silicosulfide, a lithium germanosulfide, a lithium lanthanum oxide, a lithium titanium oxide, a lithium borosulfide, a lithium aluminosulfide, a lithium phosphosulfide, or a mixture thereof. The protective layer may have a high ionic conductivity for lithium ions.

A compound with very low ionic conductivity, such as a lithium carbonate, may also be included in a pretreatment layer, since, as charging and discharging cycles repeat, a layer composed of a lithium carbonate cracks uniformly, thus allowing lithium ion conduction.

The pretreatment layer may be several nanometers to 1 µm thick, and may be in the range of tens of nanometers to 0.5 µm thick. If the thickness is less than several nanometers, the pretreatment layer's effect is minimal because it does not fully cover the lithium metal surface. If the thickness is greater than 1 µm, the energy density is adversely affected.

An organic layer may be coated as a protective layer using a coating method, such as knife coating, direct coating, reverse roll coating, gravure roll coating, gap coating, spray coating, slot die coating, or evaporation. Gravure coating and slot die coating are advantageous, since they may provide a thin organic layer. The organic layer may be about 0.1 to 10 µm thick. If the organic layer is less than 0.1 µm thick, a portion of the surface may not be coated. If greater than 10 µm thick, an undesirable overcharge may exist due to increased internal resistance.

The polymeric solution used for coating the organic layer may include fine polymer particles dispersed or fully dissolved. The latter case is advantageous because it may form a denser layer. A solvent used in the polymeric solution may have a low boiling point for easy removal, and it should not form a residue. The solvent may be the same solvent used in the electrolytic solution. Examples include dioxolane, dimethoxyethane, acetonitrile, dimethyl carbonate, tetrahydrofuran, and other similar substances. The organic layer may have the general characteristics of polymeric electrolytes, such as electrochemical stability, ionic conductivity, resistance to a solvent (i.e., insolubility in electrolytic solution), and other similar characteristics. The organic layer may be cured to enhance its mechanical properties and its resistance to a solvent. Types of curing include heat curing, UV light curing and curing by electron beams.

The substrate that includes the release component includes the release agent formed on the polymeric film or metallic film. Preferably, the release agent may be a silicon-containing compound, polyolefin, polyfluorocarbon, polyamide, polyester, polycarbonate, polyurethane, polystyrene, polycaprolactone, and mixtures and copolymers thereof. More preferably, it is a silicon-containing compound having the following formula:

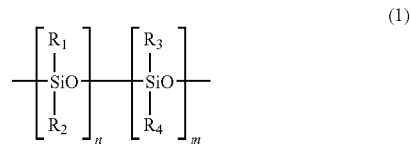

wherein $R_1$ to $R_4$ are independently a $C_{1-7}$ alkyl group, a $C_{1-7}$ heteroalkyl group, a $C_{6-20}$ aryl group, a $C_{7-30}$ arylalkyl group, a $C_{4-30}$ heteroaryl group, or a $C_{5-30}$ het and $1 \leq m \leq 1,000,000$ and $1 \leq n \leq 1,000,000$, where m and n are integers.

The substituents $R_1$ to $R_4$ should not all be aliphatic compounds having more than 7 carbon atoms since it is difficult to prepare or commercially obtain such a compound. Also, if the substituents $R_1$ to $R_4$ are all aromatic compounds having more than 20 carbon atoms in an aromatic ring, release agent flexibility undesirably deteriorates. Further, if n and m are greater than 1,000,000, the release agent's release property is low.

A layer of the release agent may be about 0.1 to about 5.0 µm thick. If the release layer thickness is less than about 0.1 µm, its effect is too weak. If greater than about 5.0 µm thick, production costs are unnecessarily high. The release layer may be formed by roll coating, spray coating, gravure coating, reverse gravure coating, Mayer bar coating, die coating or other similar means. A commercially available substrate product that includes a polymeric film to which a release layer is attached may be used.

The substrate's lower portion may be a polymeric film composed of polyester, polyethylene, polypropylene or polyimide. Examples of polyester include polyethylene terephthalate, polyethylene naphthalate and other like substances. The lower portion of the substrate may also be a metallic film composed of Ni, Ti, Cu, Ag, Au, Pt, Fe, Co, Cr, W, Mo, Al, Mg, K, Na, Ca, Sr, Ba, Si, Ge, Sb, Pb, In or Zn. The polymeric or metallic film may be about 2 to about 100 µm thick.

The lithium metal anode's current collector may be composed of Ni, Ti, Cu, Ag, Au, Pt, Fe, Co, Cr, W, Mo, Al, Mg, K, Na, Ca, Sr, Ba, Si, Ge, Sb, Pb, In or Zn. The current collector may be about 100 Å to about 5 µm thick. If the current collector is less than about 100 Å thick, it becomes difficult to prepare or handle. If greater than about 5 μm thick, its energy density may be adversely affected. The current collector may be a ready-made metallic foil attached to the substrate, or it may be deposited on the substrate by conventional deposition using heating. If formed by deposition, a deposition rate may be in the range of about 0.1 to about 1000 Å/sec. If the deposition rate is less than about 0.1 Å/sec, production efficiency may be decreased. If greater than about 1000 Å/sec, the release property may deteriorate.

The deposited lithium metal may be about 1 to about 200 μm thick. If less than about 1 μm thick, the battery may have a low capacity. If greater than about 200 μm thick, the energy density may be adversely affected.

After pretreating the lithium metal or depositing the protective layer, a separator may be attached to the pretreated lithium metal or the deposited protective layer. The separator may prevent possible damage to the lithium metal anode when it is released from the substrate, and it protects against tension applied during a subsequent winding process. Thus, by attaching the separator to the protective layer, the released lithium metal anode may have a current collector/lithium metal/protective layer/separator layere structure. The separator may be attached to the protective layer after it dries. Alternatively, the separator may be attached to the protective layer immediately after the layer is coated on the lithium metal surface, and then the product can be dried. While the latter case has a longer drying time, it provides close adherence between the separator and the protective layer. Polymers that may be used in the separator include polyvinylidene fluoride (PVDF), polytetrafluoroethylene (PTFE), vinylidene fluoride-hexafluoropropylene (PVDF-HFP) copolymer, teterfluoroethylene-hexafluoropropylene (TFE-HFP) copolymer, polychlorotrifluoroethylene, perfluoroalkoxy copolymer, fluorinated cyclic ether and other like substances, or mixtures of the same. FIG. 1 is a cross-sectional view of a lithium metal anode after a separator 4 is attached and before being released from a substrate. Referring to FIG. 1, a current collector layer 1, a lithium metal layer 2, a protective layer 3, and a separator 4 are sequentially disposed below a substrate including a polymeric or metallic film 6 formed on a release layer 5.

A lithium metal anode prepared by the method of the present exemplary embodiment has a current collector containing Si or F on an exposed surface. The F derives from a release agent containing an F component.

Hereinafter, exemplary embodiments of the present invention will be described in more detail with reference to the following examples, which are given for the illustration purposes and are not intended to limit the scope of the invention.

EXAMPLES

Example 1

A silicon resin composition including 22.5% by weight Syl-off 7900, 2.5% by weight Syl-off 7922 and 75% by weight water was coated on a 25 μm thick polyethylene terephthalate film using the Mayer bar coating method. Next, the coated substrate was dried at 180° C. for two minutes to obtain a 0.3 μm thick silicon resin release layer. Copper was deposited on the release layer to a thickness of 3000 Å at a deposition rate of 10 Å/sec. Lithium metal was then deposited to a thickness of 15 μm on a surface of the deposited copper. Finally, the lithium metal anode was released from the polyethylene terephthalate substrate.

Example 2

A lithium metal anode was prepared in the same manner as in Example 1, except that the copper deposition rate was 50 Å/sec.

Example 3

A lithium metal anode was prepared in the same manner as in Example 1, except that the deposition thickness of copper was 6000 Å.

Example 4

A lithium metal anode was prepared in the same manner as in Example 1, except that the copper deposition rate was 50 Å/sec and the deposition thickness of copper was 6000 Å.

Example 5

A lithium metal anode was prepared in the same manner as in Example 1, except that a 25 μm thick aluminum foil was used in the lower portion of the substrate in place of the polyethylene terephthalate film.

Example 6

A silicon resin composition including 22.5% by weight Syl-off 7900, 2.5% by weight Syl-off 7922 and 75% by weight water was coated on a 25 μm thick polyethylene terephthalate film using the Mayer bar coating method. Next, the coated substrate was dried at 180° C. for two minutes to obtain a 0.3 μm thick silicon resin release layer. Copper was deposited to a thickness of 3000 Å on the release layer at a deposition rate of 10 Å/sec. Lithium metal was then deposited on a surface of the copper to a thickness of 15 μm. Subsequently, 1.25 g of amorphous polyethylene oxide and 0.545 g of $LiN(CF_3SO_2)_2$ were mixed into 19 g of acetonitrile and stirred to obtain a uniform solution. The resulting polymeric solution was coated on the lithium-deposited specimen prepared above using a dipping method. The resultant product was dried under a vacuum for one hour to obtain an organic protective layer. Finally, the lithium metal anode was released from the polyethylene terephthalate substrate.

Example 7

A lithium metal anode was prepared in the same manner as in Example 6, except that after the formation of the organic protective layer, a 15 μm thick polyethylene separator was attached to it.

Comparative Example 1

A 25 μm thick polyethylene terephthalate film was used as a substrate. Copper was deposited to a thickness of 3000 Å on the polyethylene terephthalate film as a current collector at a deposition rate of 10 Å/sec. Lithium metal was then deposited to a thickness of 15 μm on the deposited copper. Finally, the lithium metal anode was released from the polyethylene terephthalate film.

Experimental Example 1

Release Test

Figure 2:
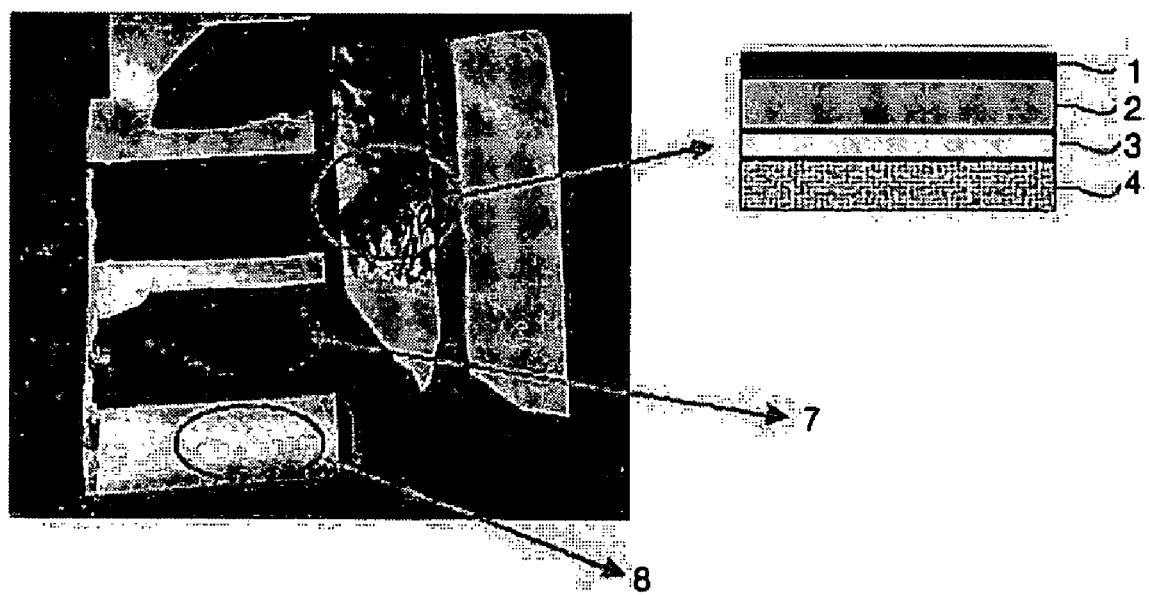
FIG. 2 shows a photograph of a lithium metal anode prepared according to an exemplary embodiment of the present invention.

The states of the substrate surfaces were observed after releasing the lithium metal anodes prepared in Examples 1 to 7 and Comparative Example 1 from the substrates. Table 1 shows the results. FIG. 2 is a photograph of the lithium metal anode prepared in Example 7. Specifically, FIG. 2 shows the lithium metal anode 8 prepared in Example 7 after the separator 4 was attached to the organic protective layer 3 and before being released from the substrate. FIG. 2 also shows the surface 7 of the polyethylene terephthalate substrate after the lithium metal anode was released from it. Finally, FIG. 2 also shows a front side and a back side of the released lithium metal anode prepared in Example 7.

TABLE 1

|  | Example 1 | Example 2 | Example 3 | Example 4 | Example 5 | Example 6 | Example 7 | Comparative Example 1 |
|---|---|---|---|---|---|---|---|---|
| State of Released Surface | ○ | □ | □ | ○ | ○ | ○ | ○ | x |

☐ very clean
○ clean
☐ trace of copper layer remained
x nearly impossible to release Experimental Example 2

Elemental Analysis of Released Surface

Figure 3:
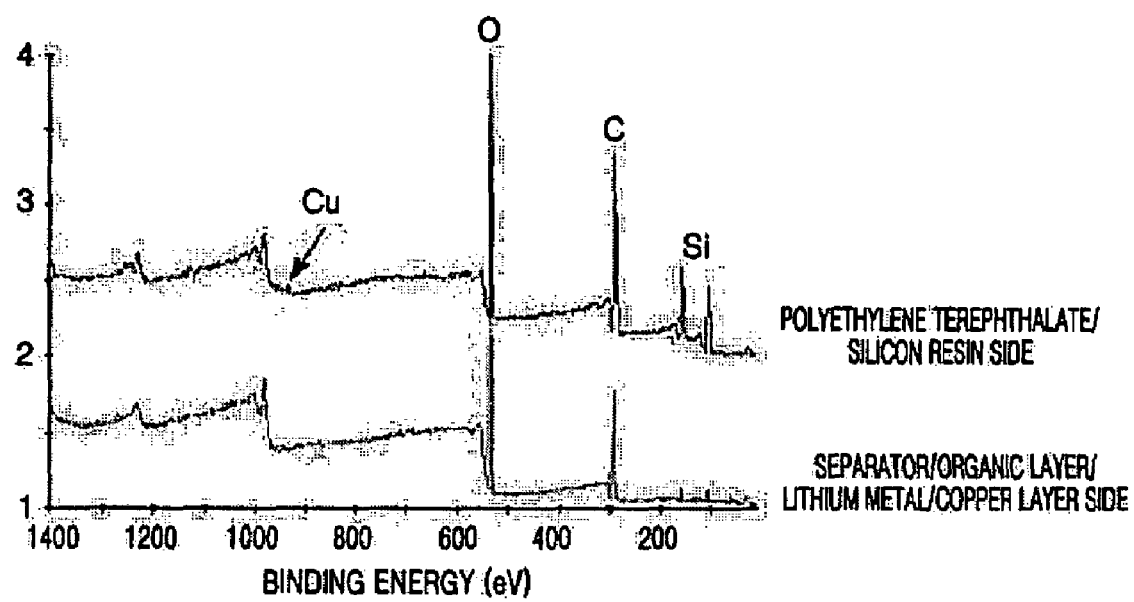
FIG. 3 shows the results of an elemental analysis by x-ray photoelectron spectroscopy (XPS) on released surfaces of a copper layer of a lithium metal anode and a polyethylene terephthalate film.

After the anode of Example 7 was released, the released side of the copper layer of the lithium metal anode and the released side of the polyethylene terephthalate film were subject to an elemental analysis by XPS (x-ray photoelectron spectroscopy). FIG. 3 shows the results. Si, C, O and a trace amount of Cu were detected on the surface of the polyethylene terephthalate film, and large amounts of C, O, a small amount of Si, and a trace amount of Cu were detected on the surface of the copper layer. These results confirm that in the release operation of the present method, release occurred between a separator/protective layer/lithium metal/copper layer/Si resin layer and a Si resin layer/PET substrate. On the other hand, based on the fact that a trace amount of Cu was detected on the surface of the cupper layer, an estimated 100 Å thick Si resin layer remained on the current collector's exposed surface. Table 2 shows the results of qualitative elemental analysis of the released surfaces.

TABLE 2

|  | C 1s (%) | O 1s (%) | Si 2p (%) |
|---|---|---|---|
| separator/organic layer/lithium metal/copper layer side | 45.9 | 49.1 | 5 |
| PET film side | 47.9 | 26.7 | 25.4 |

As described above, the method of preparing a lithium metal anode according to an embodiment of the present invention produces a lithium metal anode with a clean lithium surface and including a current collector with a small thickness. The lithium metal anode can be used to increase the energy density of a battery.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of preparing a lithium metal anode, comprising:
    forming a current collector on a substrate that includes a release agent, the current collector being formed directly on the release agent;
    depositing a lithium metal on the current collector; and
    releasing the current collector with the deposited lithium metal from the substrate,
    wherein the release agent comprises a layer having a thickness in the range of 0.1 μm to 5 μm.

2. The method of claim 1, further comprising the step of pretreating the lithium metal or depositing a protective layer on the lithium metal.

3. The method of claim 2, wherein the pretreating is performed with oxygen, nitrogen or carbon dioxide plasma, simple exposure to gas, deposition of an inorganic material having an ionic conductivity, or metal deposition.

4. The method of claim 3, wherein a metal used in the metal deposition is copper or nickel.

5. The method of claim 2, wherein the protective layer is a metal layer, an organic material layer, an inorganic material layer, an organic material/inorganic material layer, an inorganic material/organic material layer, an inorganic material/organic material/inorganic material layer, or an organic material/inorganic material/organic material layer.

6. The method of claim 5, wherein the organic material comprises a PEO-based polymer, a siloxane-based polymer, or a phosphazine-based polymer.

7. The method of claim 3 or 5, wherein the inorganic material is at least one selected from the group consisting of a lithium nitride, a lithium carbonate, a lithium silicate, a lithium borate, a lithium aluminate, a lithium phosphate, a lithium phosphorous oxynitride, a lithium silicosulfide, a lithium germanosulfide, a lithium lanthanum oxide, a lithium titanium oxide, a lithium borosulfide, a lithium aluminosulfide, or a lithium phosphosulfide.

8. The method of claim 2, further comprising the step of attaching a separator to the pretreated lithium metal or to the deposited protective layer.

9. The method of claim 1, wherein the substrate comprises a polymeric film or metallic film.

10. The method of claim 9, wherein the polymeric film comprises polyester, polyethylene, polypropylene or polyimide.

11. The method of claim 9, wherein the metallic film comprises Ni, Ti, Cu, Ag, Au, Pt, Fe, Co, Cr, W, Mo, Al, Mg, K, Na, Ca, Sr, Ba, Si, Ge, Sb, Pb, In or Zn.

12. The method of claim 1, wherein the current collector comprises Ni, Ti, Cu, Ag, Au, Pt, Fe, Co, Cr, W, Mo, Al, Mg, K, Na, Ca, Sr, Ba, Si, Ge, Sb, Pb, In or Zn.

13. The method of claim 1, wherein the current collector is formed by a deposition process or by attachment of a metallic foil.

14. The method of claim 13, wherein the current collector is formed by deposition, and a deposition rate is in the range of about 0.1 to about 1000 Å/sec.

15. The method of claim 1, wherein the current collector has a thickness in the range of about 100 Å to about 5 μm.

16. The method of claim 1, wherein the deposited lithium metal has a thickness in the range of about 1 to about 200 μm.

17. The method of claim 1, wherein depositing the lithium metal on the current collector comprises depositing the lithium metal directly on the current collector.

18. A method of preparing a lithium metal anode, comprising:
   forming a current collector on a substrate that includes a release agent;
   depositing a lithium metal on the current collector; and
   releasing the current collector with the deposited lithium metal from the substrate,
   wherein the substrate comprises a polymeric film or metallic film,
   wherein the release agent is at least one selected from the group consisting of a silicon-containing compound, polyolefin, polyfluorocarbon, polyamide, polyester, polycarbonate, polyurethane, polystyrene, polycaprolactone, or copolymers thereof, and
   wherein the release agent comprises a layer having a thickness in the range of 0.1 μm to 5 μm.

19. The method of claim 18, wherein the silicon-containing compound has the following formula:

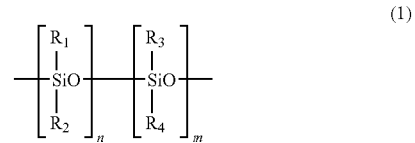

(1)

wherein $R_1$ to $R_4$ are independently a $C_{1-7}$ alkyl group, a $C_{1-7}$ heteroalkyl group, a $C_{6-20}$ aryl group, a $C_{7-20}$ arylalkyl group, a $C_{4-30}$ heteroaryl group, or a $C_{5-30}$ heteroarylalkyl group, and $1 \leq m \leq 1{,}000{,}000$ and $1 \leq n \leq 1{,}000{,}000$ are integers.

* * * * *

UNITED STATES PATENT AND TRADEMARK OFFICE
CERTIFICATE OF CORRECTION

PATENT NO. : 7,629,083 B2  Page 1 of 1
APPLICATION NO. : 10/920196
DATED : December 8, 2009
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1512 days.

Signed and Sealed this

Second Day of November, 2010

David J. Kappos
*Director of the United States Patent and Trademark Office*